(12) United States Patent
Vuori (10) Patent No.: US 6,990,180 B2
(45) Date of Patent: Jan. 24, 2006

(54) SHORT VOICE MESSAGE (SVM) SERVICE METHOD, APPARATUS AND SYSTEM

(75) Inventor: Petri Vuori, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 427 days.

(21) Appl. No.: 09/911,078

(22) Filed: Jul. 23, 2001

(65) Prior Publication Data

US 2002/0146097 A1  Oct. 10, 2002

Related U.S. Application Data

(60) Provisional application No. 60/281,942, filed on Apr. 5, 2001.

(51) Int. Cl.
*H04M 1/64* (2006.01)

(52) U.S. Cl. .............................. 379/88.25; 379/201.1; 455/466

(58) Field of Classification Search .............. 379/88.12, 379/88.22, 88.23, 88.25, 201.1, 88.26, 88.18; 455/466, 445; 709/106, 205
See application file for complete search history.

(56) References Cited

U.S. PATENT DOCUMENTS

| 5,459,871 | A | * | 10/1995 | Van Den Berg ............ 709/104 |
| 5,724,410 | A | * | 3/1998 | Parvulescu et al. ...... 379/88.18 |
| 5,822,700 | A | * | 10/1998 | Hult et al. .................. 455/466 |
| 6,097,962 | A | * | 8/2000 | Corriveau et al. .......... 455/466 |
| 6,215,859 | B1 | * | 4/2001 | Hanson .................... 379/88.22 |
| 6,240,296 | B1 | * | 5/2001 | Yu et al. ................... 379/88.22 |
| 6,301,609 | B1 | * | 10/2001 | Aravamudan et al. ...... 709/207 |
| 6,507,735 | B1 | * | 1/2003 | Baker et al. ................ 455/466 |
| 6,697,840 | B1 | * | 2/2004 | Godefroid et al. .......... 709/205 |
| 2005/0065791 | A1 | | 3/2005 | Kim ........................... 704/231 |

FOREIGN PATENT DOCUMENTS

EP    1185068    3/2002

OTHER PUBLICATIONS

Philonenko et al., Instant message Presence Protocol For Facilitating Communication Center Activity, Jan. 9, 2003.*
Day et al., A Model For Presence And Instant Messaging, Feb. 2000, Request For Comments 2778.*
Universal Mobile Telecommunications System (UMTS); Multimedia Messaging Service (MMS), Functional description; Stage 2 (3GPP TS 23.140 version 4.2.0 Release 4); ETSI TS 123 140 V4.2.0 (Mar. 2001), XP-002180514.
GSM 03.40 v 5.3.0 (Jul. 1996), Digital Cellular Telecommunications System (Phase 2+); Technical Realization of the Short Message Service (SMS) Point–to–Point (PP).
ITU–T H. 323 (Feb. 1998), Series H: Audiovisual and Multimedia Systems: Infrastructure of Audiovisual Services—Systems and Terminal Eguipment for Audiovisual Services; "Packet–Based Multimedia Communications Systems".

(Continued)

*Primary Examiner*—Scott L. Weaver
*Assistant Examiner*—Gerald Gauthier (57) ABSTRACT

Tiresome entry of numerous letters of the alphabet into a hand-held device for assembling a short text message for transmission via a short message service (SMS) to a second terminal is avoided by the sending of a short voice message (SVM). The SVM is recorded in the sending terminal and sent to a SVM service center (SVMSC). The SVMSC may notify the intended recipient of the arrival of the SVM and await acceptance before sending it. The second terminal may then commence a bidirectional communication so that an instant voice message session can be established. Alternatively, the problem can be overcome by converting the spoken SVM to text in the user terminal by means of voice recognition software and sending the converted text to the recipient by means of the traditional SMS infrastructure for display as text or for playback as text converted to voice.

32 Claims, 10 Drawing Sheets

Sending Short Voice Message - Usage

OTHER PUBLICATIONS

GSM 07.05 v5.5.0, "Digital Cellular Telecommunications System (Phase 2+); Use of Data Terminal Equipment—Data Circuit Terminating; Eguipment (DTE–DCE) Interface for Short Message Service (SMS) and Cell Broadcast Service-(CBS)", Jan. 1998.

ETSI TS 100 585 v7.0.1 (Jul. 1999), "Digital Cellular Telecommunications System (Phase 2+); Use of Data Terminal Eguipment–Data Circuit Terminating; Eguipment (DTE–DCE) Interface for Short Message Service (SMS) and Cell Broadcast Service (CBS)".

GSM 03.40 v7.4.0 (Jan. 2000), Digital Cellular Telecommunications System (Phase 2+); Technical Realization of the Short Message Service (SMS);(GSM 03.40 v 7.4.0 Release 1998).

"Instant Messaging/Presence Protocol Requirements", M. Day et al, *Network Working Group,* Feb. 2000.

"SIP: Session Initiation Protocol", M. Handley et al, *Internet Engineering Task Force Internet Draft,* Nov. 24, 2000.

"Voice Extensible markup Language (VoiceXML) Version 1.0", *VoiceXML Formu Technical Working Group,* W3C Note May 5, 2000.

"AOL's Instant Messaging Proposal Elicits Kudos and Brickbats", *IEEE Internet Computing,* Jul.–Aug. 2000, pp. 6–8.

"The IMX Architecture Interoperability with America Online's Instant Messaging Services", E. Aoki et al, *Internet Draft,* Jun. 15, 2000.

"A Model for Presence and Instant Messaging", M. Day et al, *Network Working Group,* Feb. 2000.

"The Impact of MP3 and the Future of Digital Entertainment Products", B. Ponce, *IEEE Communications Magazine,* Sep. 1999, pp. 68–70.

"The Global System for Mobile Communications Short Message Service", G. Peersman et al, *IEEE Personal Communications,* Jun. 2000, pp. 15–23.

"Standards Group Seeks to Quell Instant Messaging Wars", *IEEE Computer News Briefs,* Jun. 2000, p. 23.

"The EMA System: A CTI–Based E–Mail Alerting Service", D. Frank et al, *IEEE Communications Magazine,* Feb. 2000, pp. 122–128.

"iGSM: VoIP Service for Mobile Networks", H. C–H Rao et al, *IEEE Communications Magazine,* Apr. 2000, pp. 62–69.

"SMS Sneaks Up as Mobile Technology of Choice Among Users", www.infoworld.com *INFOWORLD,* Mar. 19, 2001, pp. 58A–58B.

"Paging Systems: Network Architectures and Interfaces", Y–B Lin, *IEEE Network,* Jul./Aug. 1997, pp. 56–61.

"Emerging Market Structures in the Digital Supply Chain", A. Susaria et al, *IEEE IT Pro* Sept/Oct 2000, pp. 33–39.

"Pigeon: A Wireless Two–Way Messaging System", T. Woo et al, *IEEE Journal on Selected Areas in Communications,* vol. 15, No. 8, Oct. 1997, pp. 1391–1405.

"iSMS: An Integration Platform for Short Message Service and IP Networks", H. CpH Rao et al, *IEEE Network,* Mar./Apr. 2001, pp. 48–55.

"Speech Recognition: The Wireless Interface Revolution", D. Clark, *IEEE Computer,* Mar. 2001, pp. 16–18.

"Voice Browsing", J. White, *IEEE Internet Computing,* Jan–Feb. 2000, pp. 55–56.

* cited by examiner

SHORT VOICE MESSAGE (SVM) SERVICE METHOD, APPARATUS AND SYSTEM

This application claims the benefit of U.S. Provisional Application No. 60/281,942 filed Apr. 5, 2001.

BACKGROUND OF THE INVENTION

1. Technical Field

The present invention relates to a new way to send messages and, more particularly, voice-type short messages.

2. Discussion of Related Art

The short message service (SMS) has been realized point-to-point (PP) and for cell broadcast services (CBS) in the Global System for Mobile communications (GSM). See the ETSI GSM Technical Specification GSM 03.40 Version 5.3.0 July 1996 and GSM 07.05 Version 5.5.0 January 1998. For a short tutorial on SMS, see "The Global System for Mobile Communications Short Message Service" by G. Peersman and S. Cvetkovic, *IEEE Personal Communications*, June 2000. A problem with entering messages for transmittal via the SMS is that it often takes too long to create the message. The user has to use a keyboard wherein each key has the capability of entering one of several possible letters of the alphabet which are individually selected by multiple depressions. This can take a long time because it is possible to send more than a hundred characters even without concatenation. With concatenation, a message can be increased much longer to tens of thousands of characters. Such can become tiresome and impractical if extended too long even if using a full keyboard on a personal computer (PC) or personal digital assistant (PDA).

DISCLOSURE OF INVENTION

An object of the present invention is to facilitate the sending of short messages.

According to a first aspect of the present invention, a method is provided for use in a telecommunications network for providing messages between users. The method comprises the steps of receiving a voice message from a first terminal spoken by a first user for a second user at a second terminal, checking availability of the second terminal, and immediately sending the received voice message to the second terminal if available. Similarly, according to a second aspect of the present invention, apparatus for use in such a telecommunications network comprises means for receiving a voice message from a first terminal spoken by a first user for a second user at a second terminal, means for checking availability of the second terminal, and means for immediately sending the received voice message to the second terminal, if available.

In accordance with both the first and second aspects of the present invention, the voice message can be stored until the second terminal is determined to be available. The second user can be notified at the second terminal of the received voice message from the first user prior to sending the voice message to the second terminal. In that case, the voice message is sent only after the second user signals acceptance.

In still further accord with the first and second aspects of the present invention, a communication session, i.e., a bidirectional communication can be established after receipt of a first message from the first terminal to the second terminal by receiving a voice message from the second terminal spoken by the second user and sending the received voice message to the first terminal. Such an interchange can be continued with numerous voice messages being exchanged between the first and second terminals. Before establishing the session, the availability of the first terminal can be established before sending the voice message from the second user to the first terminal.

Still further in accord with the first and second aspects of the present invention, the voice message received in either the first or second terminal may be stored therein for use by the receiving user at the convenience of the receiving user. Such could be stored on a SIM card, for instance.

According to a third aspect of the present invention, a voice message service center in a voice message system including a plurality of terminals comprises means for receiving a voice message from a first user terminal, means for storing the receive voice message from the first terminal, means for checking availability of an intended second user at a second terminal, and means for sending the stored received message from the first terminal to the second terminal if the second terminal is available.

In further accord with the third aspect of the present invention, the service center may further comprise means for notifying the second terminal of the voice message received from the first terminal wherein the received voice message from the first terminal is sent to the second terminal upon receiving an acceptance signal from the second terminal in response to the notification.

In still further accord with the third aspect of the present invention, one or more of the plurality of terminals comprises means for receiving the voice message at the first user terminal spoken by a first user for providing the voice message from the first user terminal to the means for receiving the voice message at the service center, means for storing voice messages including the voice message spoken by the first user, means for receiving a designation signal from the first user designating a second user as an intended recipient, means for retrieving the stored voice message in response to the designation signal for providing the voice message retrieved from storage and the designation signal, and means for sending the voice message retrieved from storage and the designation signal to the second user of the voice message system as an outgoing voice message. The one or more of the plurality of terminals may further comprise means for receiving an incoming voice message from the second user for storage in the means for storing SVMs and means for playback of the incoming voice message to the first user after retrieval from the means for storing voice messages by the means for retrieving stored voice messages. The one or more of the plurality of terminals may further comprise means for receiving notification of the incoming voice message from the second user for display or notification thereof to the first user, and means responsive to an acceptance indication input signal from the first user for sending the acceptance indication input signal for use in the voice message system in deciding whether to send the incoming voice message from the second user to the first user.

Still further in accord with the third aspect of the present invention, the means for receiving the voice message spoken by the first user includes voice recognition means for recognizing the voice message spoken by the first user for providing the voice message as a text message for storage in and retrieval from the means for storing voice messages as a text message for transmission as an outgoing text voice message via a short message service center. The means for receiving an incoming voice message from the second user may include means for receiving an incoming text voice message for storage in the means for storing voice messages as a text message and wherein the means for playback of the incoming text voice message is for displaying the incoming text message on a display of the user equipment. On the other hand, the means for retrieving the stored voice message may also be for converting the retrieved voice message to a voice signal for playback on a means for playback as an enunciated voice message, such as an artificial voice.

According to a fourth aspect of the present invention, user equipment for use in a voice message system comprises means for receiving a short voice message spoken by a first user, means for storing SVMs including the SVM spoken by the first user, means for receiving a designation signal from the first user designating a second user as an intended recipient, means for retrieving the stored SVM in response to the designation signal for providing the SVM retrieved from storage and the designation signal, and means for sending the SVM retrieved from storage and the designation signal to the second user of the voice message system as an outgoing SVM.

In further accord with the fourth aspect of the present invention, the user equipment further comprises means for receiving an incoming SVM from the second user for storage and the means for storing SVMs, and means for playback of the incoming SVM to the first user after retrieval from the means for storing SVMs by the means for retrieving stored SVMs. Such user equipment may further comprise means for receiving notification of the incoming SVM from the second user for display or notification thereof by the user equipment, and means responsive to an acceptance indication input signal from the first user for sending the acceptance indication input signal for use in the voice message system in deciding whether to send the incoming SVM from the second user to the user equipment of the first user.

In still further accord with the fourth aspect of the present invention, the means for receiving the SVM spoken by the first user may include voice recognition means for recognizing the short voice message spoken by the first user for providing the SVM as a text message for storage in and retrieval from the means for storing SVMs as a text message for transmission as an outgoing text SVM via a short message service center. Similarly, the means for receiving an incoming SVM from the second user may include means for receiving an incoming text SVM for storage in the means for storing SVMs as a text message and wherein the means for playback of the incoming text SVM is for display on a display of the user equipment. Conversion software may also be provided for converting the incoming text SVM from the second user to voice for enunciation for instance as an artificial voice.

These and other objects, features and advantages of the present invention will become more apparent in light of the following detailed description of a best mode embodiment thereof, as illustrated in the accompanying drawing.

BEST MODE FOR CARRYING OUT THE INVENTION

As mentioned above, the present invention discloses a short voice message (SVM) service or voice message service (VMS) which is a completely new way to send short messages, i.e., as voice-type short messages. According to the present invention, short voice messages (SVMs) are sent as SMS messages, SMS-like messages, or as instant messages. The user or sending principal simply records a short voice message and sends it over the network for playback at the terminal of one or more intended recipients or receiving principals.

Figure 1:
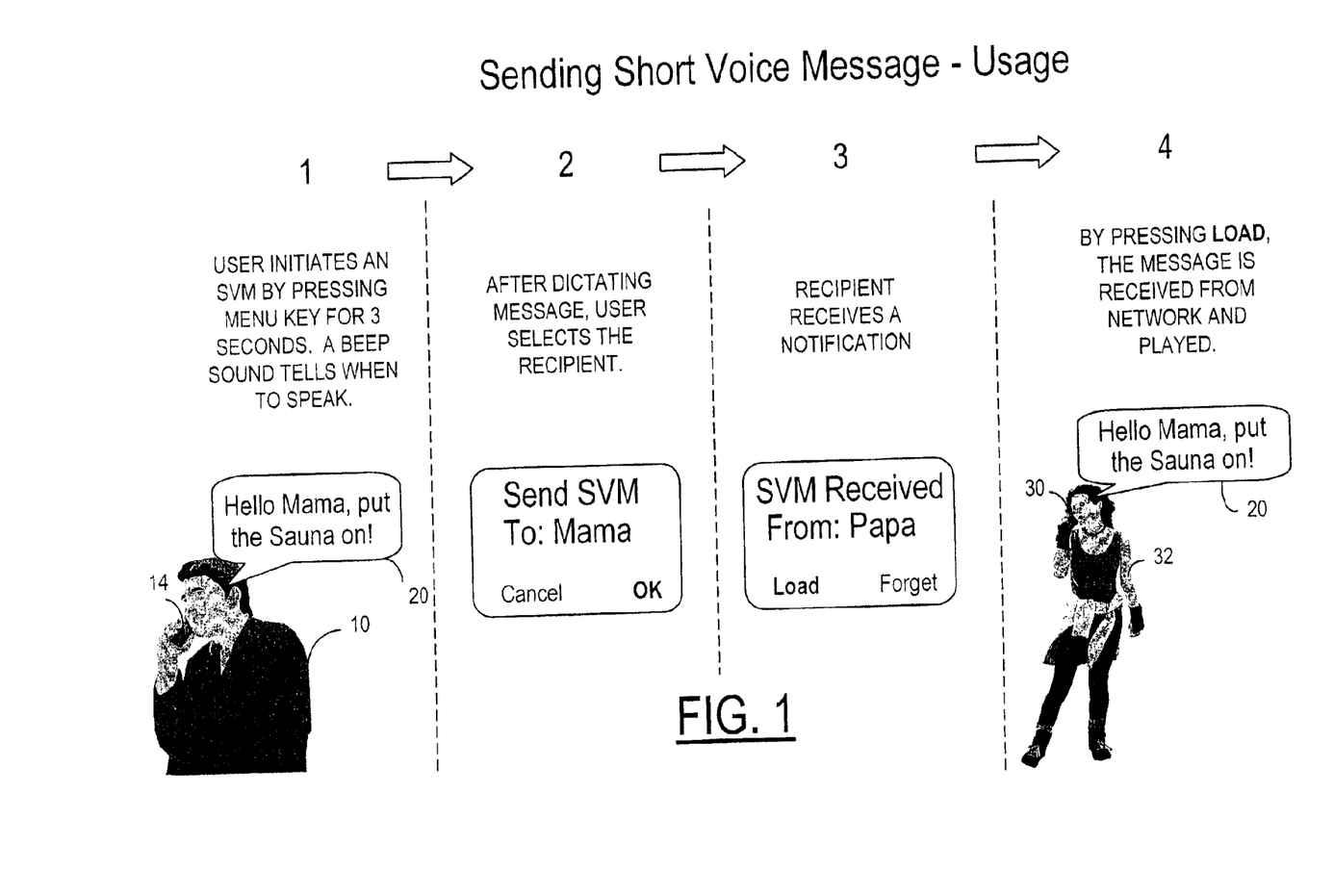
FIG. 1 shows a short voice message (SVM) service method, according to the present invention.

Referring to FIG. 1, a user 10 initiates a short voice message (SVM), e.g., by pressing a menu key on a user equipment 14 that is associated with the short voice message feature for a period of time, for instance, several seconds. As shown in a step 12 of FIG. 2, the user equipment 14 receives a signal on account of depression of the menu key by the user that a short voice message is to be spoken. As indicated in a step 16, the user equipment 14 prepares to receive a short voice message and for instance emits a beep sound to tell the user that he may commence speaking as indicated in a step 18. The user 10 then speaks into the user equipment 14 as indicated in panel 1 at a baloon 20 in FIG. 1. The user equipment 14 then receives and stores the SVM during enunciation of the spoken message, as indicated in a step 22 of FIG. 2. The SVM may be concluded in any number of ways such as by the user 10 depressing a same or different menu key for a brief period of time, for instance, an instantaneous depression. Or, the user equipment could end the message recordation by signaling the user that the maximum message length has been reached.

Figure 2:
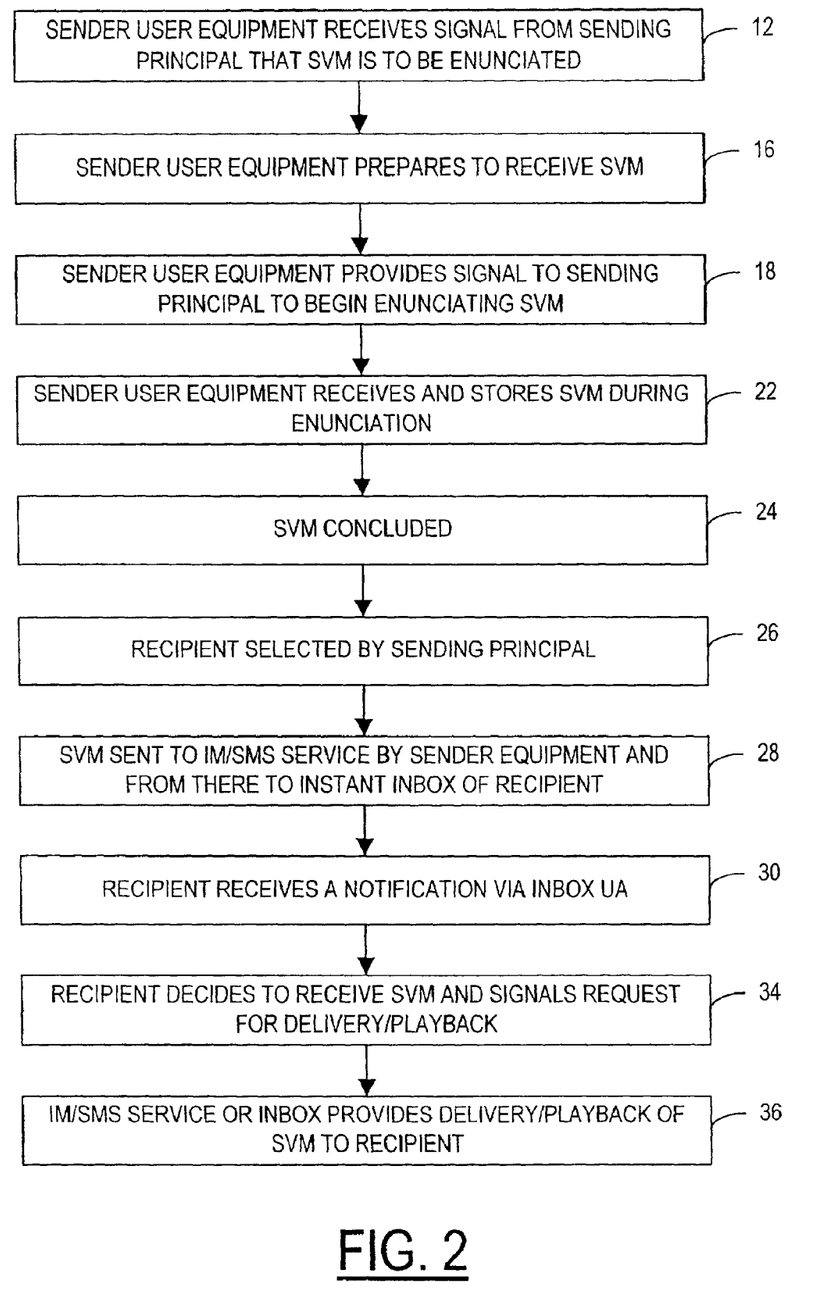
FIG. 2 is similar to FIG. 1 in showing a SVM service method, according to the present invention.

The user 10 then uses the menu key to select one or more intended recipients as indicated both in a step 26 in FIG. 2 and in a second panel labeled with a reference numeral 2 in FIG. 1. After selecting a recipient, the user may depress a menu key to initiate the transfer such as a key associated with the "OK" display of panel 2 of FIG. 1. It should be realized that the step 26 could instead be executed at a different stage of the process shown in FIG. 2. For instance, it could be executed before or after the step 12.

The SVM is then sent to an SVM service center. This could be a short message service (SMS) service center which determines the availability of the one or more intended recipients. The service center may then send the SVM immediately to those intended recipients who are available and continue attempting to send to those not then available until they become available or until a time out occurs. On the other hand, instead of sending the SVM immediately upon determining availability, the service center may instead notify the available recipient or recipients that an SVM message has been received and which may identify the sender on a display of each available recipient's user equipment 30 as shown in panel 3 of FIG. 1. A transfer of the SVM message to the SVM service center is indicated in a step 28 as well as the sending of a notification, if applicable. The reception of the notification is indicated in a step 30.

After that, if applicable the recipient 32 (as shown in panels 3 & 4 of FIG. 1) decides as indicated in a step 34 of FIG. 2 to decline ("forget") or accept ("load") the SVM received from the sender and depresses a corresponding key or otherwise signals (e.g. voice) acceptance or not. Assuming the recipient 32 decides to accept the SVM, a step 36 is executed in which the short voice message service center provides delivery of the SVM to the recipient for playback as shown in the replicated baloon 20 in panel 4. It will be realized as indicated above that instead of sending a notification as indicated in the step 30, the SVM service could instead send the SVM directly to the intended recipient without giving the recipient any discretion as to whether to accept or not. This might be the case for instance in a conventional SMS or instant messaging (IM) context where the sender first determines whether the intended recipient is available by means of a presence service and the intended recipient has effectively acquiesced to availability by previously joining a "buddy list" or otherwise subscribing to the service. In that case, the voice message spoken by the initiating user is immediately sent to the user equipment of the intended recipient where it can be annunciated without further intervention or recorded on the recipient's SIM card for playback at the recipient's discretion.

It should be realized that the process shown in FIGS. 1 and 2 can be reversed for messaging from user 32 to user 10 so that an interchange of communications between the two users may take place.

Figure 3:
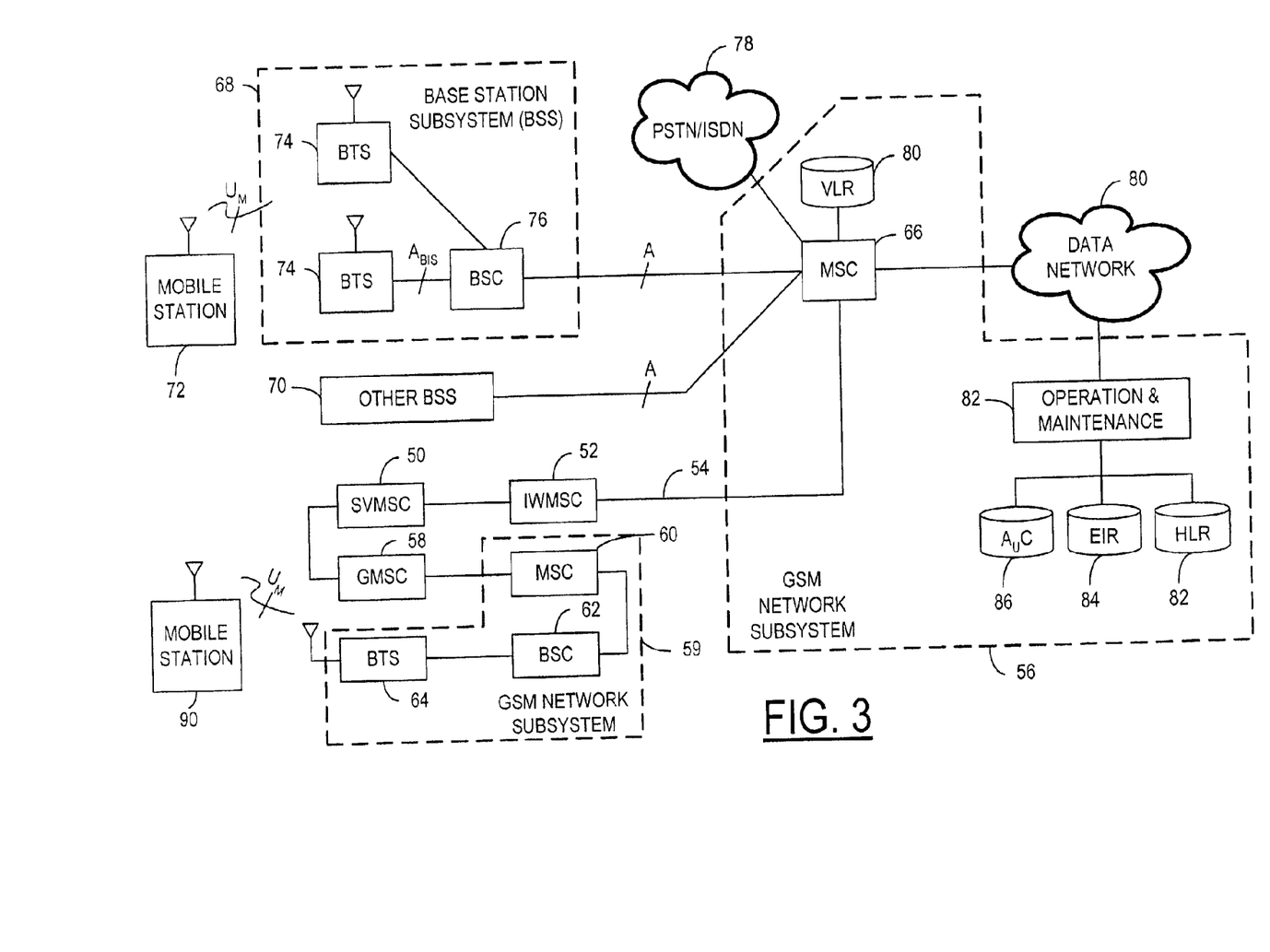
FIG. 3 shows the SVM service method of the present invention applied to GSM network subsystems.

The short voice message service may be carried out in a GSM network as shown in FIG. 3. A short voice message (SVM) service center 50 is shown along with an interworking MSC 52 connected by a line 54 to a GSM Network Subsystem 56. A gateway 58 is for interworking between the SVMSC 50 and a mobile switching center (MSC) 58 of another GSM network 59 including an MSC 60, a BSC 62, and a BTS 64. The first-mentioned GSM Network Subsystem 56 also includes an MSC 66 is connected to a base station subsystem (BSS) 68 as well other base station subsystems 70 for communication with a plurality of mobile stations, the figure showing only one mobile station 72 for convenience. The BSS 68 includes one or more base transceiver stations (BTS) 74 as well as a base station controller 76 which is in turn connected to the MSC 66. The MSC is also connected to a public switched telephone network (PSTN) and/or ISDN network 78 for allowing mobile stations to communicate with wired telephone sets in a circuit-switched manner. The MSC 66 is also connected to a plurality of databases including a VLR 80, HLR 82, EIR 84, and AuC 86 which may be connected to the MSC directly or via a data network 80 and operation and maintenance center 82. An interworking function (not shown) may be needed between the data network 80 and the MSC 58.

The SVMSC 50 of FIG. 3 may utilize the protocol layer for the existing SMS point-to-point service with the capability to transfer short messages e.g. of 140 octets of data in each packet data unit (PDU). According to an SMS feature that is particularly advantageous for purposes of the present invention, the SMS service provides the capability of concatenating messages of a length that can be increased to e.g. 38,760 or 16,830 depending on the character coding scheme used. These concatenated PDUs can be strung together to form a short voice message, according to the present invention, in any combination of from 1 to 255 PDUs of 140 octets each. In this way, short voice messages such as illustrated in FIGS. 1 and 2 can be transmitted between a mobile station 72 in one GSM network subsystem 56 and another mobile station 90 associated with another GSM network subsystem 59. The sequence of steps shown in FIG. 2 from an initiating user 10 to a receiving user 32 can be reversed in direction so that the user 32 sends a reply to the user 10. In the case shown in FIG. 3, this interchange would take place entirely between GSM network subsystems 56, 59.

Figure 4:
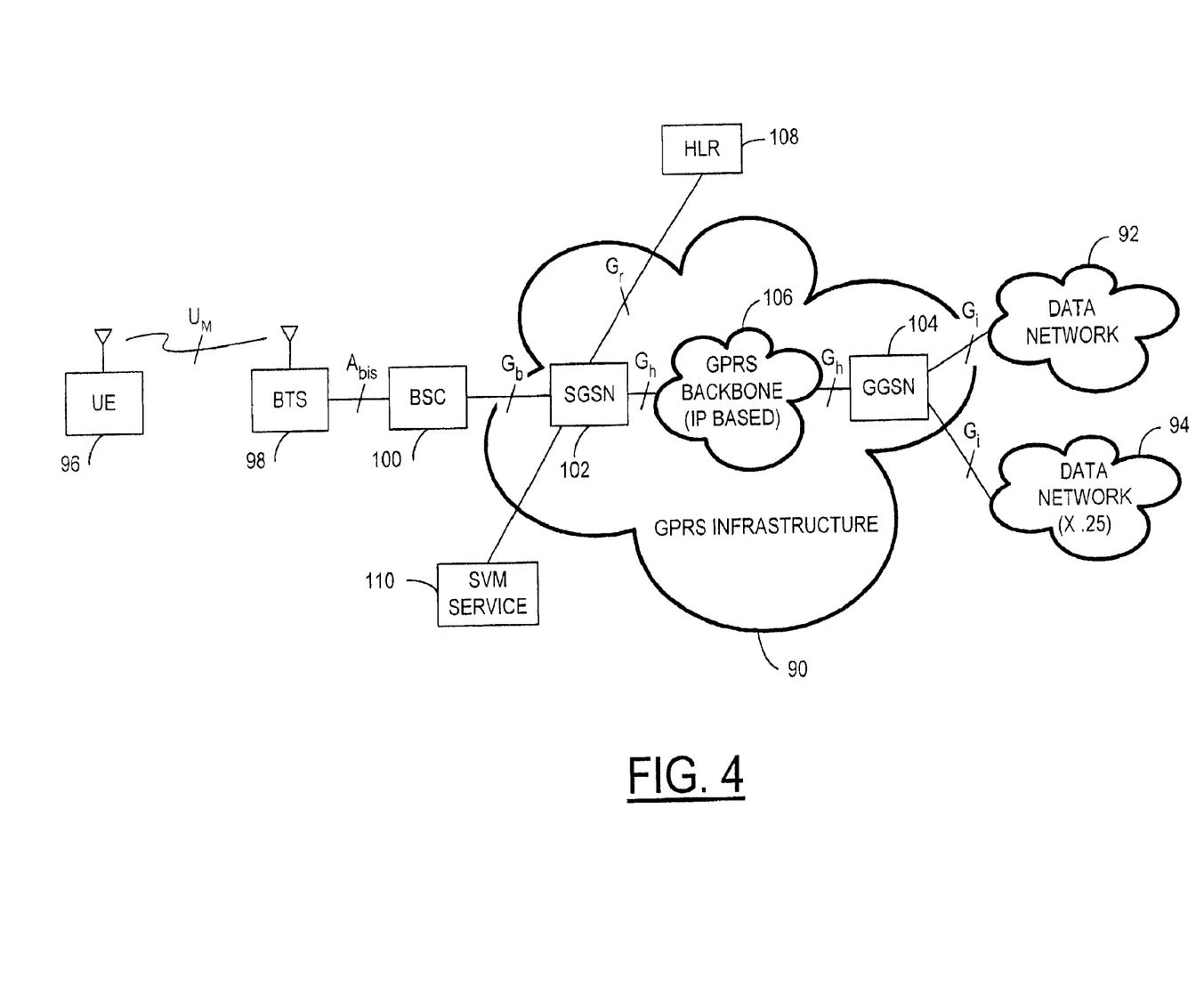
FIG. 4 shows the SVM service method of the present invention applied to a GPRS system.

In addition to carrying out the present invention on the GSM network subsystems 56, 59 of FIG. 3, it should be realized that other approaches are possible, especially considering the development of GSM networks into a packet-based infrastructure via the General Packet Radio Service (GPRS) and subsequently the Universal Mobile Telecommunications System (UMTS). As shown in FIG. 4, a GPRS infrastructure 90 is capable of being connected to various data networks including for instance the Internet 92 or an x.25 network 94. At the subscriber side, a user equipment (UE) 96 communicates via a radio link (Um) to a Base Transceiver Station 98 which is connected to a Base Station Controller 100 in turn connected to the GPRS infrastructure 90. GPRS is a data service for GSM. It is a packet-switched mobile datacom service that is the next step in the evolution of GSM. It enables relatively high-speed mobile datacom usage and is very useful for "bursty" data applications such as mobile Internet browsing, email and push technologies and it can be applied to the SVM service of the present invention. It has been demonstrated at speeds as fast as 150 kbps. The GPRS infrastructure includes a serving GPRS support node (SGSN) 102 connected to the BSC 100 as well as a gateway GPRS support node (GGSN) 104 that can be connected to the packet data networks 92, 94. The SGSN 102 and GGSM 104 may be interconnected by a GPRS backbone (IP based) 106. The SGSN 102 may be connected to an HLR 108 similar to the HLR 74 of FIG. 3. It may also be connected to an SVM Service 110 similar to the SVM Service Center 50 of FIG. 3, according to the present invention for connection to a GSM Network Subsystem, to another GPRS infrastructure, or similar.

Figure 5:
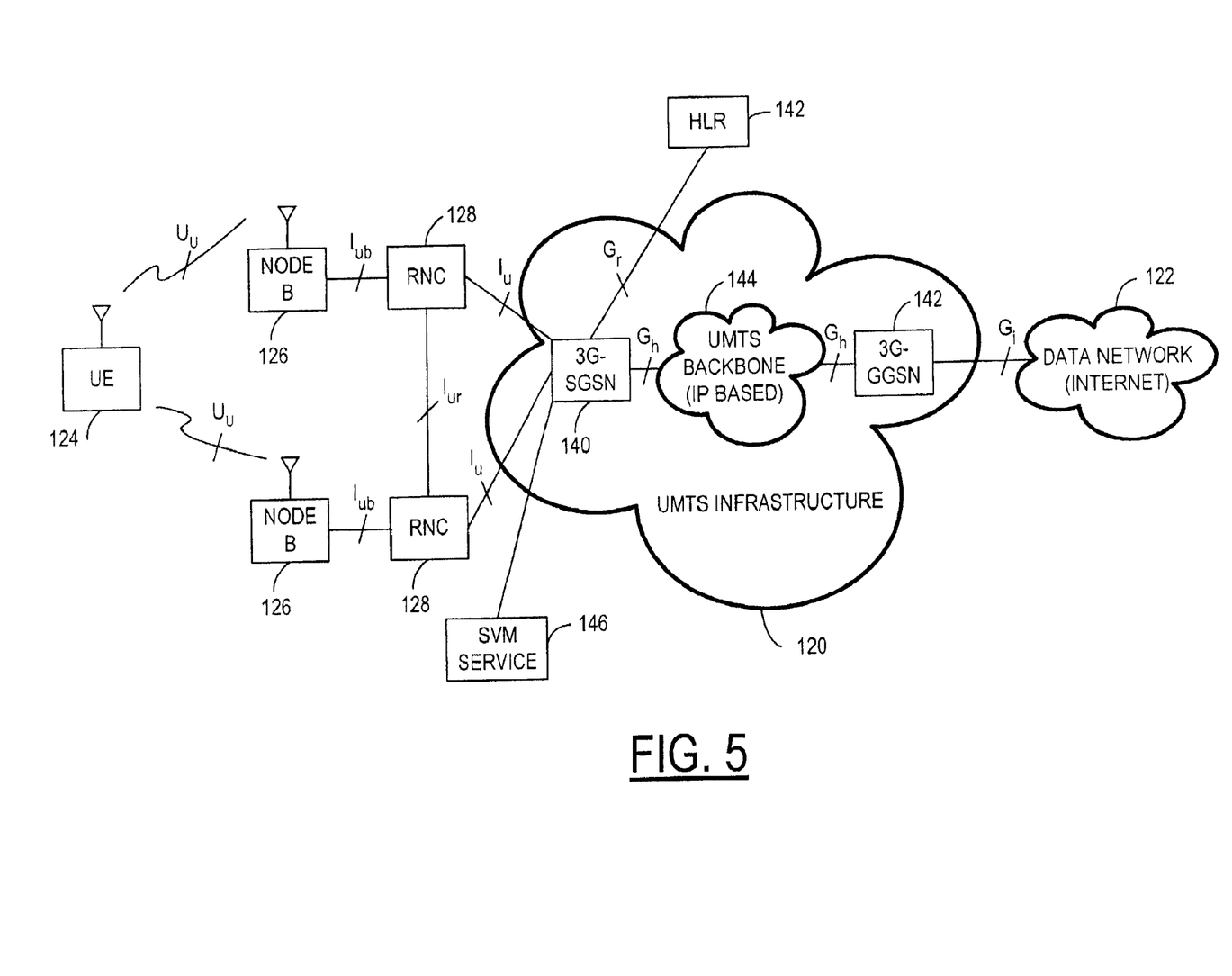
FIG. 5 shows the SVM service method of the present invention applied to a UMTS system.

The present invention may also be implemented on a UMTS packet network architecture such as shown in FIG. 5. A universal mobile telecommunications system (UMTS) infrastructure 120 is shown in FIG. 5 connected to a data network 122 such as the Internet. At the subscriber side, a user equipment 124 is connected by one or more radio links (Uu) to one or more corresponding Node Bs 126 which are in turn connected (Iub) to corresponding radio network controllers (RNCs) 128. The RNCs 128 may be interconnected (Iur) as shown for purposes of improving the radio links and facilitating handover. The RNCs 128 are connected to the UMTS infrastructure 120 via Iu interfaces to a third generation-serving GPRS support node (3G-SGSN) 140. This may be also connected to an HLR 142 similar to the HLR 108 of FIG. 4 and the HLR 74 of FIG. 3. The 3G-SGSN 140 may be connected to a 3G-gateway GPRS support node (3G-GGSN) 142 by means of a IP-based UMTS backbone 144. It may also be connected to an SVM service 146 similar to the SVM service center 50 of FIG. 3, according to the present invention for connection to a GSM Network Subsystem, to another UMTS infrastructure, to a GPRS infrastructure, or similar. The present invention may also be implemented using the networks of FIGS. 4 and 5 as shown in an open architecture example in FIG. 6.

Figure 6:
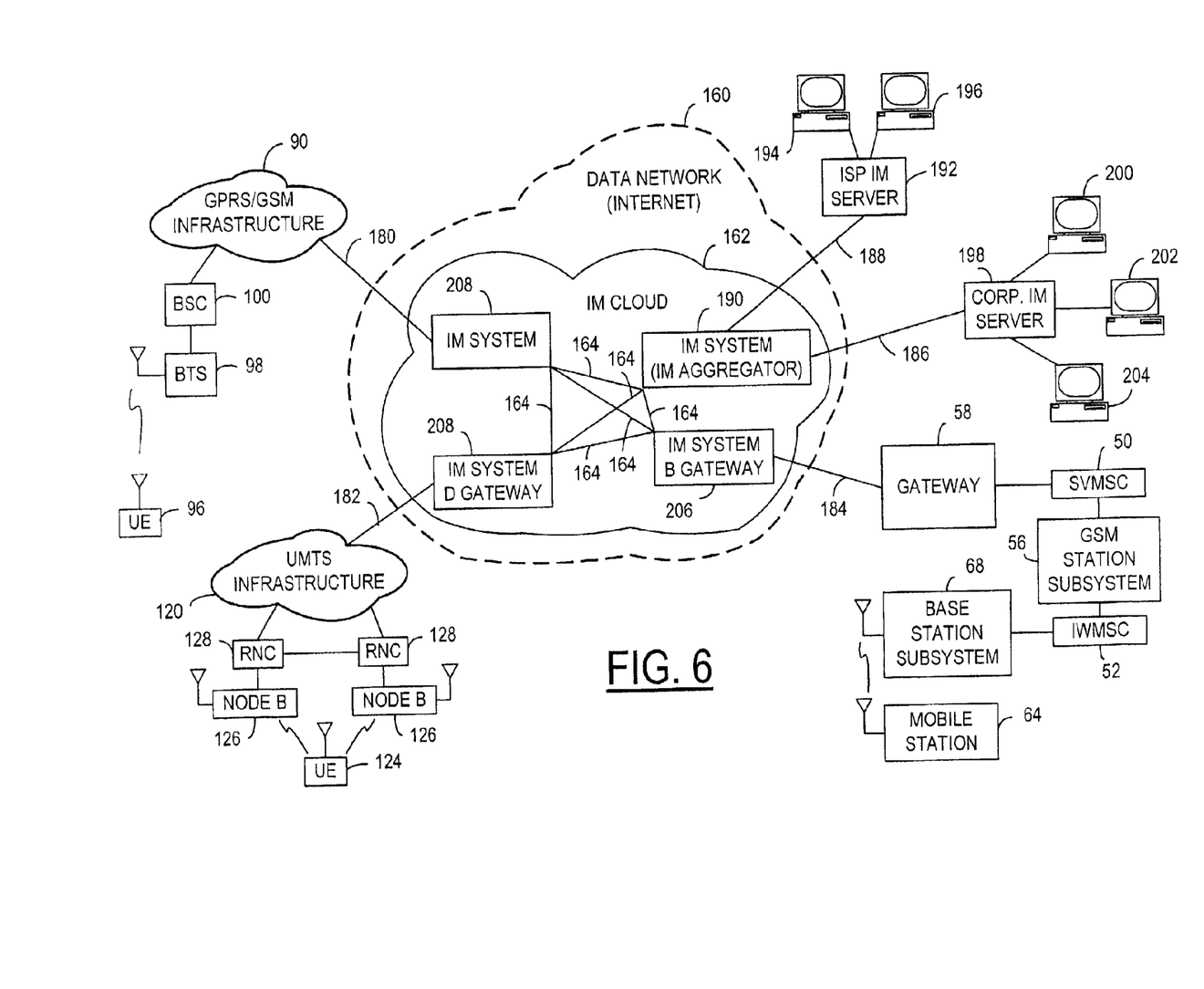
FIG. 6 shows the SVM service method of the present invention applied to an instant messaging infrastructure proposed by a third party operator of a proprietary instant messaging service.

FIG. 6 shows a data network 160 such as the data network 80 of FIG. 3, the data network 92 of FIG. 4, or the data network 122 of FIG. 5. Within the data network is an instant messaging (IM) cloud 162 which contains an instant messaging architecture such as proposed in Internet Draft "draft-aol-imx-00.txt" by E. Aoki and A. Wick dated Jun. 15, 2000 and entitled "The IMX Architecture Interoperability with America On Line's Instant Messaging Services". This open IM architecture is illustrated and discussed for instance in the publication IEEE *Internet Computing* in an unattributed article entitled "AOL's Instant Messaging Proposal Elicits Kudos and Brickbats" dated July–August 2000. This proposal by AOL includes three main ways to participate in the proposed public IM cloud. IM System Hosts may be public, may be aggregators, or may be privately-owned gateways. A plurality of IM systems are shown within the IM cloud 162 of FIG. 6 and communicate with each other according to the above-mentioned proposal using an open IMX protocol. The communications between hosts in the IM cloud is via on-demand, persistent TCP connections using the open IMX protocol. This is signified by open IMX protocol lines 164 interconnecting the IM systems. The systems within the IM cloud communicate outside the cloud with proprietary or vendor-specific client protocols 180, 182, 184, 186, 188. These are server-to-server protocols and are not the same as the open IMX protocol interconnecting the IM systems within the IM cloud. These vendor-specific client protocols may be different from each other and may be used to connect various entities to the IM cloud via the data network 160. It should be mentioned that although the IM cloud 162 is shown within the data network 160, it could be a separate entity connected to the various clients directly or via the data network 160. As many IM systems as want to can be part of the IM cloud 162, according to the above-mentioned AOL proposal. Further to the proposal, companies, IM services, or ISPs can run their own IM system by either being right in the cloud or connecting to the cloud through an IM aggregator 190. For instance, an ISP IM server 192 is connected by the line 188 to the IM system aggregator 190. This ISP 192 can provide instant message services to IM clients 194, 196 which can be independent of each other. Similarly, a corporate IM server 198 can be connected to the aggregator 190 by the line 186 for providing IM services to its own clients 200, 202, 204, within and without the enterprise.

According to the present invention, in addition to the above-mentioned ISP 192 and corporate IM server 198, for example, short voice messages can be provided from, to, or between the clients 194, 196, 200, 202, 204 via the data network 160 which may include the IM cloud 162. Furthermore, in addition to the IM system aggregator, other IM systems 206, 208, 210 can be provided for the purpose of interconnecting various wireless user equipments 96, 124 and other mobile stations such as the mobile station 72 to the IM cloud 162 for purposes of interchanging short voice messages between wireless systems or between various systems including SVM exchanges between wireless and land based systems.

In the alternative, it has been proposed in IETF RFC 2778 dated February 2000 (before the AOL proposal) to provide a presence and instant messaging system according to "a model for presence and instant messaging" by M. Day (Lotus), J. Rosenberg (Dynamiesoft) and H. Sugano (Fujitsu). An exemplary instant message service is shown for instance in FIG. 7 according to the above-mentioned model for presence adapted to SVM, according to the present invention. An SVM presence service 248 serves to accept SVM presence information e.g. on a line 250, store it, and distribute it, e.g., on a line 252. An SVM presentity 254 is a client that provides the presence information on the line 250 to be stored and distributed. Another set of clients called SVM watchers such as an SVM watcher 256 in FIG. 7, receives SVM presence information on the line 252 from the SVM presence service 248.

Figure 8:
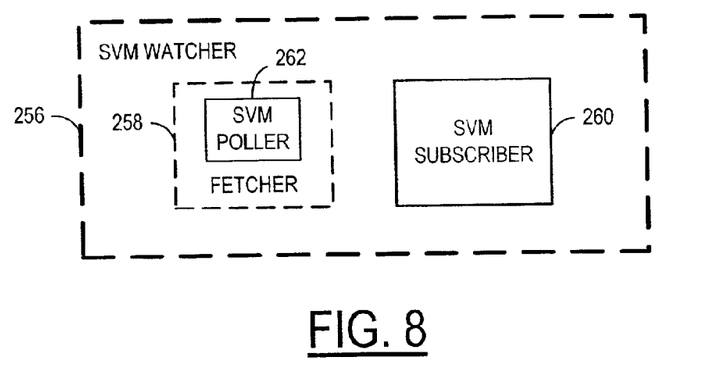
FIG. 8 shows details of alternative watchers for the watcher of FIG. 7.

As shown in FIG. 8, according to an adaptation of RFC 2778, there are two kinds of SVM watchers, called SVM fetchers 258 and SVM subscribers 260. An SVM fetcher 258 simply requests the current value of some SVM presentity's presence information from the presence service 248. In contrast, an SVM subscriber 260 requests notification from the SVM presence service 248 of (future) changes in some SVM presentity's presence information. A special kind of SVM fetcher is one that fetches SVM presence information on a regular basis. This is called an SVM poller 262.

Figure 7:
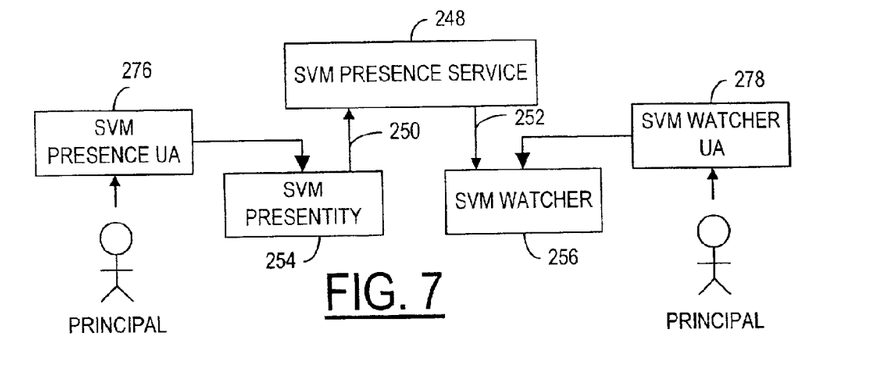
FIG. 7 shows the SVM service method of the present invention applied to a presence service as proposed to the IETF.

The SVM presence service 248 of FIG. 7 also has SVM watcher information about SVM watchers and their activities in terms of fetching or subscribing to SVM presence information. The SVM presence service may also distribute SVM watcher information to some SVM watchers, using the same mechanisms that are available for distributing SVM presence information. Changes to SVM presence information are distributed to SVM subscribers via notifications.

Figure 9:
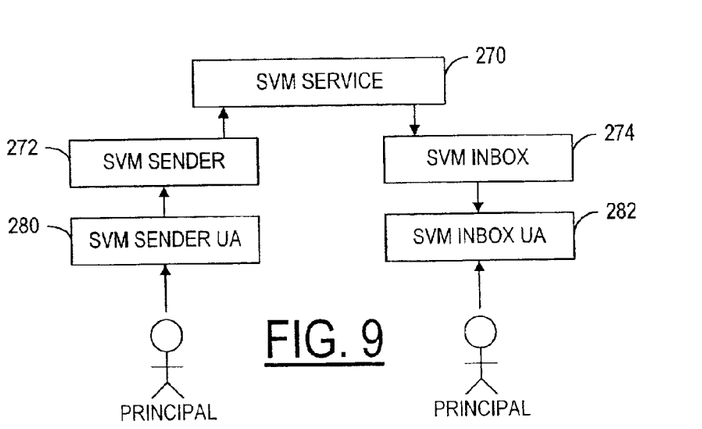
FIG. 9 shows the SVM service method of the present invention applied to an instant messaging service proposed to the IETF.

Associated with the SVM presence service 248 of FIGS. 7 and 8, is an SVM service such as shown in FIG. 9. The above mentioned RFC 2778 models an instant messaging service responsive to messages from a sender for providing messages to an instant inbox. In FIG. 9, there is shown a short voice message service 270 responsive to messages from an SVM sender 272 for providing short voice messages to an SVM inbox 274. Thus it will be realized that the SVM service of the present invention can be carried out on the model for presence and instant messaging described in RFC 2778 as well as according to an open IM architecture such as proposal as shown in FIG. 6. If carried out on the model of RFC 2778, then the SVM users will fulfill roles such as fulfilled by the "principals" of RFC 2778 wherein the term "principal" refers to people, groups and/or software in the "real world" outside of the system that use the system as a means of coordination and communication. The users 10, 32 of FIG. 1 would fall within this definition. It is stated in RFC 2778 that it is entirely outside the model presented there as to how the real world maps on to "principals" i.e., the system of model entities knows only that two distinct principals are distinct, and two identical principals are identical. A principal interacts with the system via one of several user agents (UAs) such as shown in FIGS. 7 and 9. These user agents may for instance be carried out as defined in internet draft "ietf-sip-rfc 25436is-02.ps" entitled "SIP: Session Initiation Protocol" by Handley et al, dated Nov. 24, 2000. According to the present invention therefore, the presence service of FIG. 7 is adapted to keep track of "presence" of SVM service users and principals interact with such an adapted system via an SVM presence UA 276 and an SVM watcher UA 278. Similarly, as shown in FIG. 9, principal users of the SVM service 270 interact therewith using a SVM sender UA 280 and an SVM inbox UA 282. It should be mentioned, as is mentioned in RFC 2778, that the different kinds of user agents are split apart in the model even though most implementations will combine at least some of them. A user agent is purely coupling between a principal and some core entity of the system (SVM inbox 274, SVM sender 272, SVM presentity 254, SVM watcher 256). It will therefore be understood that the simple examples shown in RFC 2778 are applicable to the SVM service of the present invention.

Figure 10:
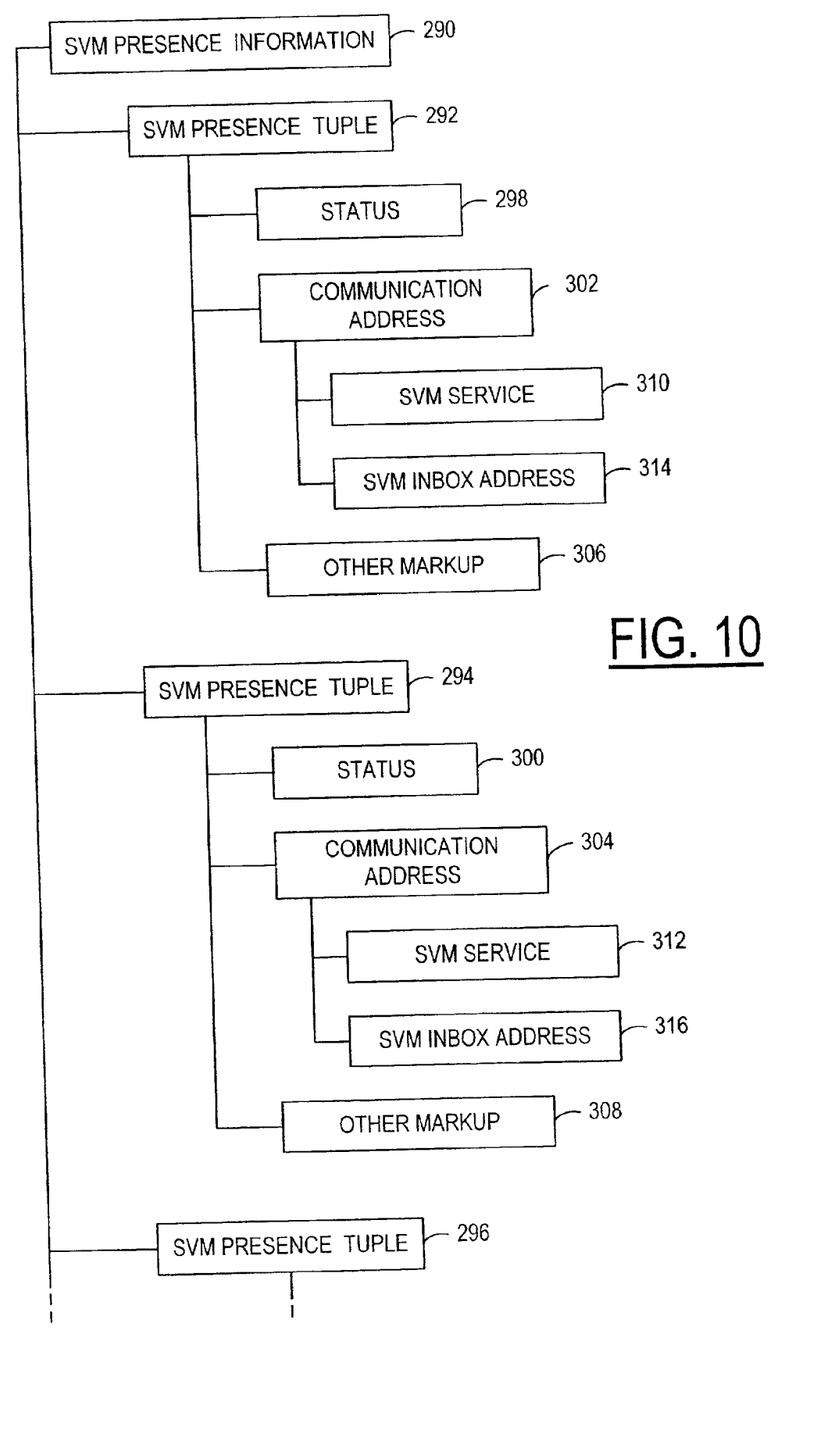
FIG. 10 shows the SVM service method of the present invention applied to create presence information according to a proposal to the IETF.

Referring now to FIG. 10, the SVM service of the present invention is shown as part of the SVM presence information 290 of the presence service 248 of FIG. 7. The presence information comprises an arbitrary number of elements, called presence tuples 292, 294, 296 . . . ,n. Each such element comprises a status marker 298, 300 (which might convey information such as on-line/off-line/busy/away/do not disturb), an optional communication address 302, 304, and optional other presence markups 306, 308. A communication address 302, 304 includes a communication means which, according to the present invention, is an SVM service 310, 312. It also includes an SVM inbox address 314, 316, according to the present invention. Status 298, 300 is further defined, as guided by the model to have at least two states that interact with instant message delivery—open, in which short voice messages will be accepted, and closed, in which short voice messages will not be accepted. Status can be interpretable by programs or by persons and can consist of single or multiple values as spelled out in the IETF model of RFC 2778.

Referring back to FIG. 9, it will be realized that the SVM presence service of FIG. 7 and FIG. 10 has an effect on the short voice messaging service in that since the SVM in-box 274 is a receptacle for short voice messages, its SVM inbox address 314 can be included in the presence tuple 292, 294 to define how a short voice message should be delivered to that short voice message inbox. As noted above, certain values of the status marker 298, 300 indicate whether short voice messages will be accepted at the SVM inbox 274. Therefore, the combination of the SVM presence service of FIG. 7 and the SVM service of FIG. 9 constitute an IM system similar to that shown in FIG. 6 except being a more "open" architecture than that shown in FIG. 6.

A problem with prior art SMS systems is that they are proprietary systems wherein each SMS center is different, depending on the vendor. To avoid such a problem with the inventive SVM services, the open RFC 2778 approach or similar is recommended. Other approaches which make for a more transparent applicability of the inventive SVM service would include a platform that integrates IP networks with the short voice message service in both mobile and fixed networks. For the mobile case, such an integrated platform would be similar to that shown in the article "iSMS: An Integration Platform for Short Message Service and IP Networks" by H. Chung-Hwa Rao et al, *IEEE Network*, March/April 2001, pages 48–55. In that article, instead of having a proprietary SMSC and gateway interconnecting a mobile network with an IP network, a so-called iSMS gateway is proposed having a mobile telephone connected with a proprietary GSM network communicating with a short message driver using an AT-command set which in turn communicates using a TCP API with an iSMS server connected to an IP network using TCP. This would also allow GSM networks of different operators to interwork with each other in a fairly painless manner. See for instance FIG. 5 of the above mentioned article by H. Chung-Hwa Rao which could easily be adapted to the SVM service center of the present invention, as will be apparent to anyone of skill in the art. This approach could also be used between the IM System B Gateway 206 and SVMSC 50 of FIG. 6, thereby avoiding any need for the gateway 58.

Figure 11:
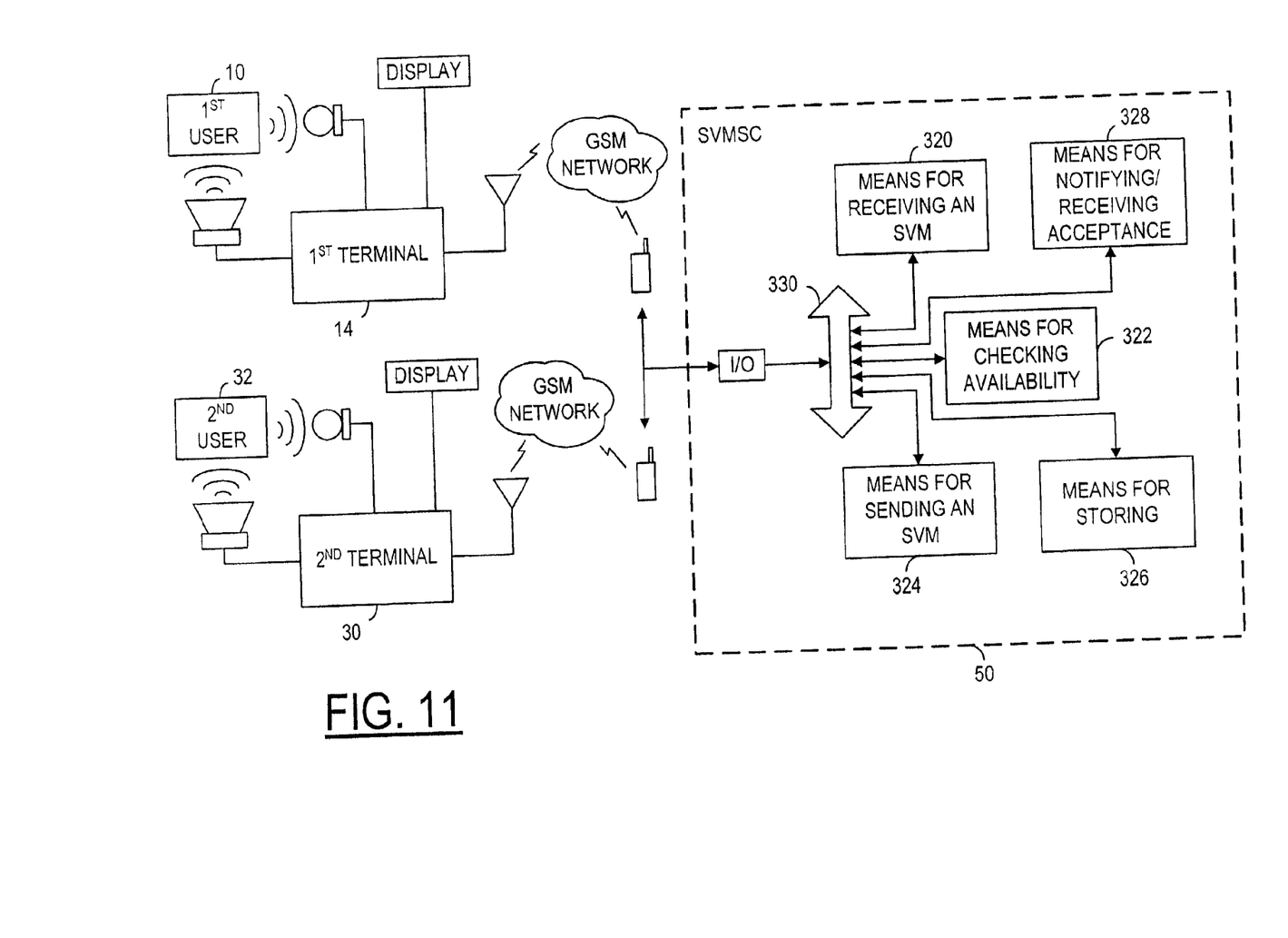
FIG. 11 shows details of a SVM service center, according to the present invention as shown interfaced to a pair of terminals via one of many possible alternative networks.

Referring now to FIG. 11, a generalized SVMSC 50 is shown interfacing with the first terminal 14 and the second terminal 30. The first terminal is for use by the first user 10 and the second terminal 30 by the second user. Each terminal has a display, microphone, speaker and antenna associated therewith, although the wireless connection between the terminals and the SVMSC may be replaced by a wired connection for one or both terminals as shown in FIG. 6. The SVMSC of FIG. 11 includes means 320 for receiving an SVM from the first terminal spoken by the first user intended by the first user for delivery to the second user at the second terminal. The SVMSC is able to check the availability of the second terminal by means 322 for checking such availability. Such may reside in whole or in part in one or both of the illustrated GSM networks. If the second terminal is available, the SVMSC immediately sends the received voice message to the second terminal by means 324.

The voice message may be stored temporarily in a means 326 for storing short voice messages in the SVMC until it is determined that the second terminal is available. In some implementations, it may be desired to notify the second terminal of recipient of an SVM before actually sending it. In that case, a means 328 for notifying is provided in the SVMC which is able to send a notification to the second user at the second terminal of the existence of a received voice message from the first user intended for the second user. If the second user signals acceptance, the SVMSC causes the received SVM to immediately be sent to the second terminal. In other words, it is retrieved from the means 326 for temporarily storing the SVM (or from another storage location outside the SVMSC) and immediately delivered to the second terminal.

Once the second user has received the SVM from the first user, the second user may simply do nothing or may instead reply. In that case, the second user initiates an SVM in the same manner as shown in FIG. 1 except in the reverse direction. The SVMSC then receives a short voice message from the second terminal spoken by the second user and immediately sends the received voice message to the first terminal. In some cases, if a significant lag of time has elapsed between the sending of the message from the first terminal to the second terminal and the initiation of a reply from the second terminal or for some other reason, it may be advisable to check the availability of the first terminal before carrying out the step of immediately sending the received voice message from the second terminal to the first terminal. This can be under the control of a timing algorithm.

It should also be mentioned that the short voice messages exchanged between the first and second terminals may also be stored within the terminals themselves after transmission from the SVMSC. For instance, such short messages may be stored on the SIM card within each terminal or, in the case of a hard-wired terminal, on some other storage medium such as a hard drive, EEPROM, or random access memory.

The various blocks shown in the SVMSC 50 of FIG. 1 are shown interconnected by a common bus 330 which is in turn connected to an input/output (I/O) port which is itself connected to a pair of mobile phones by an antenna or some other connection. These mobile phones are in communication with antennas of the first and second terminals via corresponding GSM networks serving the respective first and second users. It should be realized that the various blocks illustrated within the SVMSC may be carried out functionally on one or more integrated circuits or as part of software executed by a general purpose signal processor. In that case, the bus 330 constitutes a data, address and control bus interconnected to various components such as a central processing unit (CPU), clock, random access memory (RAM), read only memory (ROM), etc. Also in that case, the ROM stores code which is used by the CPU to execute the functional blocks shown in FIG. 11. For the case shown, in which the first and second terminals 14, 30 are subscribers to service providers from different companies, the SVMSC can ideally be carried out according to the iSMS gateway approach described above in order to ameliorate interworking complexities that would be caused by the SVMSC having proprietary interfaces. Therefore, the SVMSC of FIG. 11 is shown communicating with two separate GSM networks using the above-mentioned iSMS methodology but adapted to the SVM service center model of the present invention. In such a case, the SVMSC can be implemented on a laptop.

Figure 12:
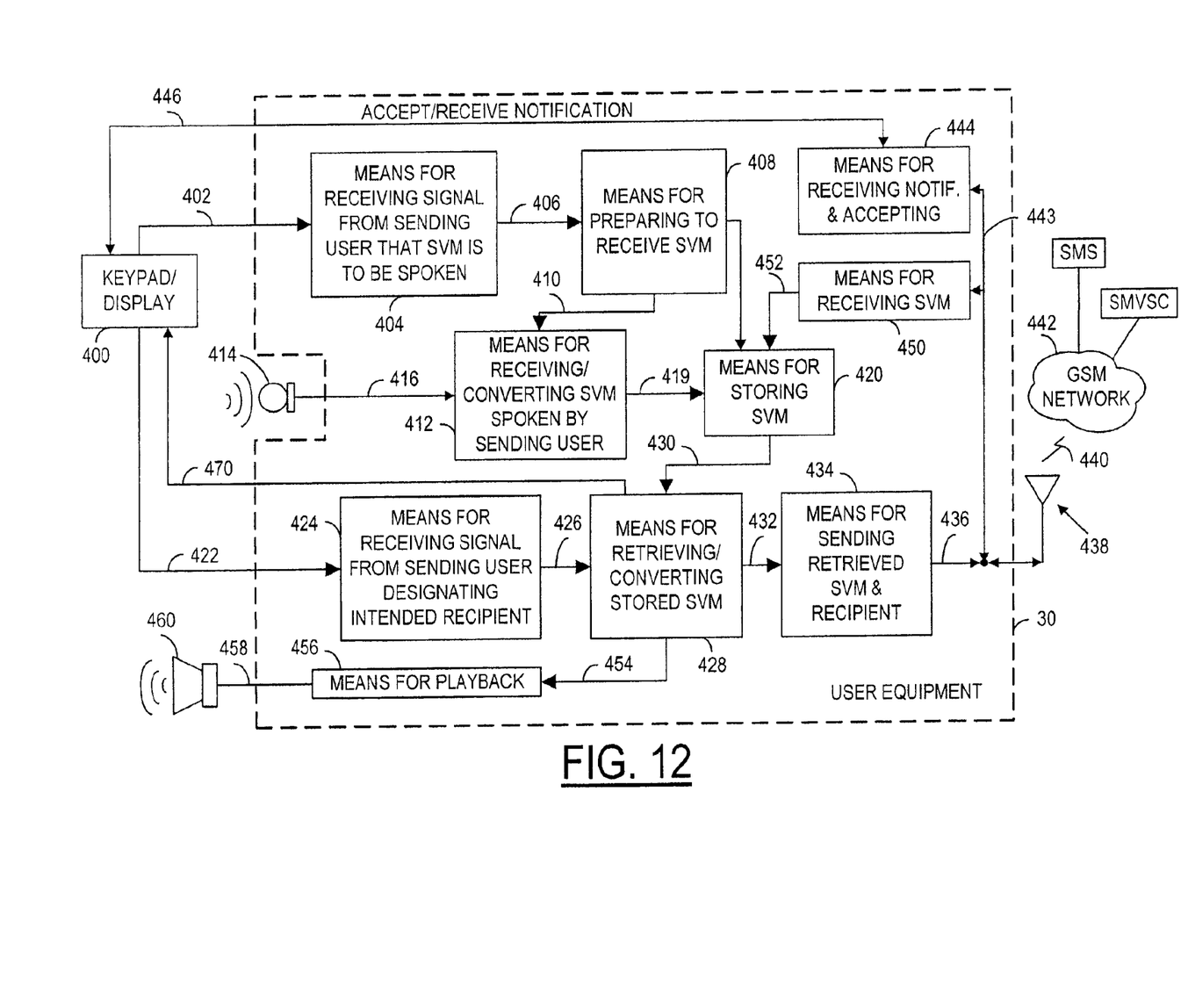
FIG. 12 shows details of a user equipment, according to the present invention, as shown interfaced to one of many possible networks.

FIG. 12 shows details of a user equipment such as the user equipment 14 or the user equipment 30 of FIG. 1. Such may include an input/output device 400 including but not limited to a keypad and display. The keypad may be used to receive an input from the sending user that an SVM is to be spoken. This may be signaled by the sending user pressing a key of the keypad which causes a signal on a line 402 to be provided to a means 404 for receiving and registering the signal on the line 402 from the sending user that an SVM is to be spoken. This causes a signal on the line 406 to be provided to a means 408 for preparing to receive the SVM. This means 408 in turn provides a signal on a line 410 to a means 412 for receiving the SVM spoken by the sending user into a microphone 414 which provides a signal on a line 416 to the means 412 that converts the signal on the line 416 to a coded signal indicative of speech for being decoded at the receiving end for playback as speech. This coded signal may be provided on a line 419 to a means 420 for storing the SVM temporarily. Once the SVM message is completed, the user may select the recipient as indicated at panel 2 in FIG. 1 by means of the keypad 400 which provides a selection signal on a line 422 to a means 424 for receiving such a signal from the sending user designating the intended recipient which is encoded and provided on a signal line 426 to means 428 for retrieving the SVM stored in the storage means 420 as conveyed on a line 430. The stored SVM along with the encoded information designating the intended recipient is provided on a signal line 432 to a means 434 for sending the retrieved SVM on a line 436 to an antenna 438 for transmission on a wireless link 440 to a GSM network 442. From there, it may be sent to an SVMSC similar to the SVMSC of FIG. 11.

Similarly, in the reverse direction, another user equipment provides an SVM message to an SVMSC (which may be the same SVMSC) and provides same to the GSM network 442 which in turn provides a notification on the wireless link 440 to the antenna 438 for transfer on a line 443 to a means 444 for receiving such notifications. This notification signal is provided on a line 446 to the display 400 in a manner similar to that shown in panel 3 of FIG. 1. The receiving user can then depress a key to "load" or "forget" the incoming SVM message. Assuming the receiving user depresses the keypad on a key corresponding to "load" and thereby signals acceptance, a signal is provided on the line 446 to the means 444 for accepting the notified SVM message. The acceptance is signaled on the line 443 to the antenna 438 for transmission to the SVMSC via the wireless link 440 and the GSM network 442. The SVMSC then provides the SVM to the GSM network 442 which in turn provides it over the wireless link 440 to the antenna 438 for transfer to a means 450 for receiving the SVM. The receiving means 450 then provides the received SVM on a line 452 to the means 420 for storing the received SVM. It may then be retrieved by the means 428 and provided on a line 454 for playback on a means 456 which is connected by a signal line 458 to a speaker 460 for announcing the SVM to the receiving user. As with the SVMSC of FIG. 11, the user equipment of FIG. 12 may be carried out in various combinations of software and hardware including a general purpose or special purpose signal processor. As known in the art, these functionalities can be embodied in various combinations of software and hardware which functionalities are freely transferable between various degrees of software and hardware implementations.

In cases where it is undesirable to send short voice messages in the form of speech, the problem of entering numerous letters of the alphabet for assembling short messages can be overcome by converting the spoken SVM to text in the user terminal by means of voice recognition software and sending the converted text to the recipient by means of the traditional SMS infrastructure for display as text at the intended recipient's terminal or for playback as text converted to voice such as an artificial voice. In that case, referring to FIG. 12, the means 412 for receiving the spoken SVM can include voice recognition software and means for converting the recognized voice characteristics to text for provision on the line 419 as characters such as traditionally used in SMS and which takes up much less storage capacity of the means 420 for storing such messages. In that case, the means 428 retrieves the stored message and sends it over the line 432 to the sending means 434 and on to the recipient via the antenna 438, wireless link 440, GSM network 442, and a traditional SMS network such as shown which is in turn connected to the GSM network of the intended recipient. Upon receipt, the recipient's terminal may display the incoming SMS message as text in the traditional manner of SMS or may include hardware/ software for playback as text converted to voice such as an artificial voice. In that case, the recipient's user equipment would have to include in the means for receiving 428 a converting means for converting the textual message to a voice signal on the line 454 for playback and annunciation on the speaker 460. However, if only text, then it can be displayed on the display 400 without such conversion.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A voice message system including a plurality of terminals and a voice message service center, said service center comprising:

means for receiving a voice message from a first user terminal;

means for storing the received voice message from the first terminal;

a presence service for checking availability of an intended second user at a second terminal; and means for sending the stored received message from the first terminal to the second terminal if the second terminal is available, wherein one or more of said plurality of terminals comprises:

means for receiving said voice message at said first user terminal spoken by a first user for providing said voice message from said first user terminal to said means for receiving said voice message at said service center;

means for storing voice messages including said voice message spoken by said first user;

means for receiving a designation signal from said first user designating a second user as an intended recipient;

means for retrieving the stored voice message in response to the designation signal for providing the voice message retrieved from storage and the designation signal; and means for sending the voice message retrieved from storage and the designation signal to the second user of the voice message system as an outgoing voice message.

2. The system of claim 1, said service center further comprising means for notifying the second terminal of the voice message received from the first terminal wherein the received voice message from the first terminal is sent to the second terminal upon receiving an acceptance signal from the second terminal in response to the notification.

3. The voice message system of claim 1, wherein said one or more of said plurality of terminals further comprises:

means for receiving an incoming voice message from the second user for storage in the means for storing received voice messages; and means for playback of the incoming voice message to the first user after retrieval from the means for storing voice messages by the means for retrieving stored voice messages.

4. The voice message system of claim 3, wherein said one or more of said plurality of terminals further comprises:

means for receiving notification of the incoming voice message from the second user for display or notification thereof to the first user; and means responsive to an acceptance indication input signal from the first user for sending the acceptance indication input signal for use in the voice message system in deciding whether to send the incoming voice message from the second user to the first user.

5. The voice message system of claim 1, wherein the means for receiving the voice message spoken by the first user includes voice recognition means for recognizing the voice message spoken by the first user for providing the voice message as a text message for storage in and retrieval from the means for storing voice messages as a text message for transmission as an outgoing text voice message via a short message service center.

6. The voice message system of claim 5, wherein the means for receiving an incoming voice message from the second user may include means for receiving an incoming text voice message for storage in the means for storing voice messages as a text message and wherein the means for playback of the incoming text voice message is for displaying the incoming text message on a display of the user equipment.

7. The system of claim 5, wherein the means for receiving an incoming voice message from the second user is means for receiving an incoming text voice message for storage in the means for storing voice messages as a text message and wherein the means for retrieving the stored voice message is also for converting the retrieved voice message to a voice signal for playback on a means for playback as an enunciated voice message.

8. User equipment for use in a voice message system, comprising:

means for receiving a short voice message (SVM) spoken by a first user;

means for storing SVMs including said SVM spoken by said first user;

means for receiving a designation signal from the first user designating a second user as an intended recipient;

means for retrieving the stored SVM in response to the designation signal for providing the SVM retrieved from storage and the designation signal; and means for sending the SVM retrieved from storage and the designation signal to the second user of the voice message system as an outgoing SVM.

9. The user equipment of claim 8, further comprising:

means for receiving an incoming SVM from the second user for storage in the means for storing SVMs; and means for playback of the incoming SVM to the first user after retrieval from the means for storing SVMs by the means for retrieving stored SVMs.

10. The user equipment of claim 9, further comprising:

means for receiving notification of the incoming SVM from the second user for display or notification thereof by the user equipment; and means responsive to an acceptance indication input signal from the first user for sending the acceptance indication input signal f or use in the voice message system in deciding whether to send the incoming SVM from the second user to the user equipment of the first user.

11. The user equipment of claim 8, wherein the means for receiving the SVM spoken by the first user is voice recognition means for providing the SVM as a text message for storage in and retrieval from said means for storing SVMs as a text message for transmission as an outgoing text SVM via a short message service (SMS) center.

12. The user equipment of claim 9, wherein the means for receiving an incoming SVM from the second user is means for receiving an incoming text SVM for storage in the means for storing SVMs as a text message and wherein the means for playback of the incoming text SVM is for displaying the incoming text message on a display of the user equipment.

13. The user equipment of claim 8, wherein said means for sending comprises an SVM sender user agent (280).

14. The user equipment of claim 9, wherein said means for receiving an incoming SVM is an SVM inbox user agent (282).

15. Method for use in a telecommunications network for providing messages between users, comprising receiving a voice message transmitted from a first terminal for forwarding to a second user at a second terminal, checking availability of said second terminal or said second user using a presence service, and sending the voice message only if available, wherein said checking availability is a checking of a status marker (298) of a presence tuple (292) among a plurality of presence tuples of presence information (290) maintained by a presence service (248), wherein said sending the received voice message is carried out by a service (270, 310) sending the received voice message to an inbox (274) having an inbox address (314) associated with said presence tuple (292).

16. The method of claim 15, further comprising the step of notifying the second user at the second terminal of the completed voice message prior to said step of sending.

17. The method of claim 16, wherein said step of sending the received voice message to the second terminal is carried out only after the second user signals acceptance.

18. The method of claim 15, further comprising the steps of:

receiving a voice message from the second terminal spoken by the second user, and sending the received voice message to the first terminal.

19. The method of claim 18, further comprising the step of checking the availability of said first terminal before carrying out said step of sending the voice message from the second terminal to the first terminal.

20. The method of claim 15, further comprising the step of storing the voice message transmitted from the first terminal in the second terminal for playback by the second user at the convenience of the second user.

21. Apparatus for use in a telecommunications network for providing messages between users, comprising:

means for receiving a voice message from a first terminal spoken by a first user for a second user at a second terminal;

means for checking availability of said second terminal or said second user using a presence service; and means for sending the received voice message to the second terminal if available, wherein said means for checking availability is carried out by a presence service (248) checking a status marker (298) of a presence tuple (292) among a plurality of presence tuples of presence information (290) maintained by a presence service (248), wherein said means for sending is carried out by a service (270, 310) sending the received voice message to an inbox (274) having an inbox address (314) associated with said presence tuple (292).

22. The apparatus of claim 21, further comprising means for storing the voice message until the means for checking availability determines the second terminal is available.

23. The apparatus of claim 21, further comprising means for notifying the second user at the second terminal of the received voice message from the first user prior to the received voice message transmission to the second terminal.

24. The apparatus of claim 23, wherein the received voice message is sent to the second terminal only after the second user signals acceptance.

25. The apparatus of claim 21, further comprising:

means for receiving a voice message from the second terminal spoken by the second user in reply to the voice message from the first user; and means for sending the voice message received from the second user to the first terminal.

26. The apparatus of claim 25, further comprising means for checking the availability of the first terminal before sending the voice message received from the second terminal to the first terminal.

27. The apparatus of claim 21, further comprising means for storing the voice message received in the second terminal for playback to the second user at the convenience of the second user.

28. A voice message system including a plurality of terminals and a voice message service center, said service center comprising:

means for receiving a voice message from a first user terminal;

means for storing the received voice message from the first terminal;

a presence service for checking availability of an intended second user at a second terminal; and means for sending the stored received message from the first terminal to the second terminal if the second terminal is available, wherein said presence service is for checking availability by checking a status marker (298) of a presence tuple (292) among a plurality of presence tuples of presence information (290) maintained by a presence service (248), wherein said means for sending is carried out by a service (270, 310) sending the received voice message to an inbox (274) having an inbox address (314) associated with said presence tuple (292).

29. A messaging system comprising at least one terminal and a server, wherein the terminal comprises means for transmitting presence information to the server and means for receiving presence information from the server, and the server comprises means for maintaining presence information characterized in that said presence information includes presence tuples, each tuple comprising a status marker and a communication address identifying at least one of a short voice message (SVM) service and an SVM inbox address, and in that said system includes an SVM service, responsive to an instant voice message from a sending principal addressed to an SVM inbox, for checking said status marker of said SVM inbox and for delivering said instant voice message if said status marker indicates availability for receipt thereof.

30. Terminal for accessing an instant messaging service for receiving instant messages from senders of instant messages and for providing instant messages to inboxes, said service associated with a presence service for receiving presence information about presentities and for providing said presence information to watchers, said terminal comprising:

a short voice message (SVM) watcher user agent (278) for receiving presence information about an SVM presentity (254); and an SVM sender user agent (280) for providing an SVM to an SVM server (270) for delivery if said presence information indicates availability.

31. The terminal of claim 30, further comprising:

an SVM presence user agent (276) for interacting with said SVM presentity; and an SVM inbox user agent (282) for interacting with an SVM inbox (274).

32. A data structure embodied in a computer-readable medium for storage in a physical device, characterized in that the data structure is a short voice message (SVM) presence information (290) database for storing SVM presence tuples (292, 294, 296, . . . , n), each tuple having a status marker (298) indicative of availability for receipt of short voice messages, and a communication address (302, 304, . . . , n) indicative of at least one of an SVM service (310, 312, . . . , n) and an SVM inbox address (314, 316, . . . , n).

* * * * *